UNITED STATES PATENT OFFICE.

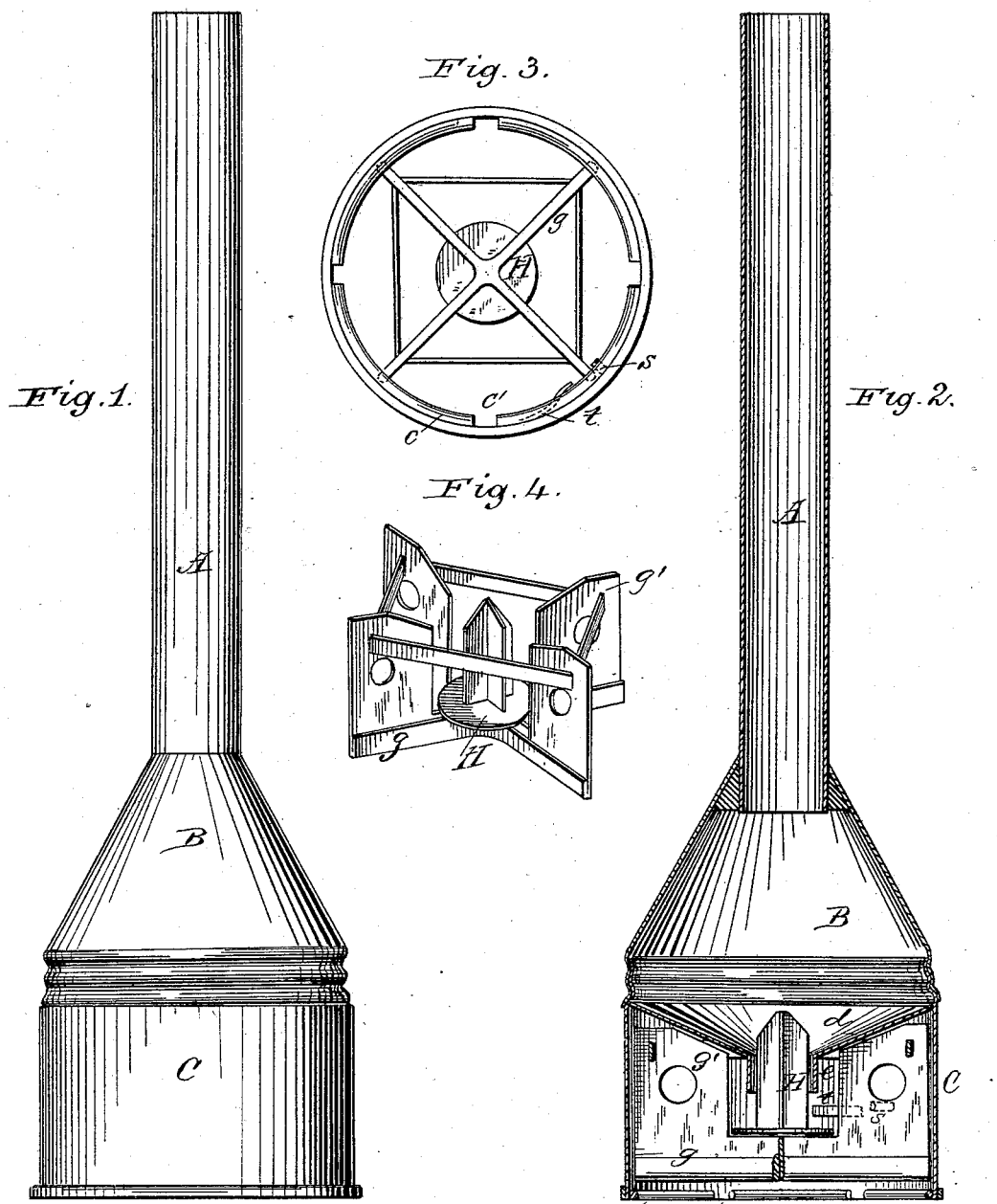

ALBERT G. MORLAN AND WILLIAM N. McKEEHEN, OF FREMONT, IND., ASSIGNORS OF ONE-THIRD TO WARREN W. WILKINSON, OF SAME PLACE.

WASHING-MACHINE.

SPECIFICATION forming part of Letters Patent No. 279,877, dated June 19, 1883.

Application filed March 29, 1883. (No model.)

*To all whom it may concern:*

Be it known that we, ALBERT G. MORLAN and WILLIAM N. McKEEHEN, citizens of the United States of America, residing at Fremont, in the county of Steuben and State of Indiana, have invented certain new and useful Improvements in a Combined Washing-Machine and Churn; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an implement which may be used either as a churn-dasher or clothes-pounder, its object being to provide an implement of this class which shall be strong, durable, and cheap in construction, efficient in operation, easily taken apart for cleansing, and not liable to get out of order.

The invention consists in certain novel constructions and combinations of devices, which will be hereinafter particularly described, and pointed out in the appended claim.

In the accompanying drawings, Figure 1 is a side elevation of an implement constructed according to our invention. Fig. 2 is a vertical central section of the same. Fig. 3 is a bottom view of the same. Fig. 4 is a perspective view of the valve-supporting frame and valve detached.

The letter A is a tubular handle, having secured to its lower end the inverted-funnel-shaped portion B, which is screwed to a cylindrical portion, C. This cylindrical portion has near its upper end a horizontal partition, $d$, somewhat depressed at its center, where it has a central opening, from which projects downwardly a short tube or thimble, $e$. Under said thimble are arranged removable intersecting cross-bars $g$, having upwardly-projecting wings $g'$, which are cut away on each side of the point of intersection of the bars.

The letter H indicates a valve adapted to close and open the lower end of the tube $e$, and is provided with the usual angular or wing stem, which passes upward through said tube. The valve rests normally on the cross-bars. These cross-bars are maintained within the cylindrical portion C by having their ends resting upon a flange or bead, $c$, which projects inwardly at the lower end of said cylindrical portion, while the upper ends of the wings $g'$ come in loose contact with the horizontal partition $d$.

The flange or bead $c$ is provided with notches $c'$ at intervals, through which the ends of the cross-bars $g$ may be inserted or removed when in position. One of the wings will strike a stud or stop, $s$, which will limit its movement in one direction, while the end of a spring, $t$, which the wing depresses in turning, will spring behind it and prevent its movement in the opposite direction. To remove the arms it is necessary first to depress this spring by the finger, so that the edge of the adjacent wing $g'$ may be slipped over it.

The operation of the implement is as follows: When it is used for a clothes-pounder the handle A is held vertically in the hand, and the open lower end of the cylindrical portion C and the cross-bars $g$ are pounded down upon the clothes in the tub, and the air which is caught within the said cylindrical portion will be compressed and forced through the suds and clothes, passing out under the edge of said cylindrical portion, the valve being at the same time forced upward. To close the tube $e$ as the implement is raised for a fresh stroke, the valve falls, opening the tube, and fresh air passes downward through the handle and tube $e$ to refill the cylindrical portion. When the implement is used as a churn-dasher, the handle A passes through the opening in the churn-lid in the usual manner, and the dasher is then reciprocated vertically, as usual. The air in the cylindrical portion is compressed and forced through the milk or cream, when the dasher is forced downward, and a fresh supply of air flows into said cylindrical portion when the dasher is raised, as hereinbefore described.

Having now fully described our invention and explained the operation thereof, we claim—

The combination, with the hollow handle and the detachable cylindrical portion C, having the horizontal partition provided with a central opening, and having at its lower edge a notched flange or bead, of cross-bars g, resting upon said bead, and valve H, resting upon said cross-bars, the said cross-bars being constructed as described, whereby they may be inserted through the notched bead or flange, as and for the purpose set forth.

In testimony whereof we affix our signatures in presence of two witnesses.

ALBERT G. MORLAN.
WILLIAM N. McKEEHEN.

Witnesses:
JAMES W. BASSETT,
LEWIS LYTLE.